United States Patent [19]
Follert et al.

[11] Patent Number: 5,057,006
[45] Date of Patent: Oct. 15, 1991

[54] BURNER PLATE FOR A FLAT BURNER

[75] Inventors: Ulrike Follert, Altendunstadt; Jochen Jacobitz, Michelau/Lettenreuth, both of Fed. Rep. of Germany

[73] Assignee: Siemens Aktiengesellschaft, Munich, Fed. Rep. of Germany

[21] Appl. No.: 632,542

[22] Filed: Dec. 24, 1990

[30] Foreign Application Priority Data

Dec. 22, 1989 [DE] Fed. Rep. of Germany ....... 3942691

[51] Int. Cl.⁵ .............................................. F23D 14/12
[52] U.S. Cl. .................................................... 431/328
[58] Field of Search .............................. 431/328, 329

[56] References Cited

U.S. PATENT DOCUMENTS

| | | | |
|---|---|---|---|
| 3,434,791 | 3/1969 | Hayashi et al. | 431/328 |
| 3,472,601 | 10/1969 | Yamamura et al. | 431/328 |
| 3,697,447 | 10/1972 | Bettinardi et al. | 431/328 |
| 3,954,387 | 5/1976 | Cooper | 431/328 |

Primary Examiner—Carroll B. Dority
Attorney, Agent, or Firm—Herbert L. Lerner; Laurence A. Greenberg

[57] ABSTRACT

A flat burner plate having fuel gas passages distributed over the surface and formed of $Al_2 TiO_2$ and a method of making such by compacting and sintering the material.

15 Claims, 1 Drawing Sheet

BURNER PLATE FOR A FLAT BURNER

The invention relates to a burner plate for a flat or planar burner, having passage or admission openings distributed over the surface for fuel gas, and to a process for producing the burner plate.

A flat gas burner with a metal cup-shaped burner housing is already known from Published European Application No. 88 104 068.7. A feed line for the fuel gas and air mixture is connected to the bottom of the housing. A metal burner plate which is pierced uniformly with fine passage or admission openings is installed on the side opposite the feed line for the mixture of fuel gas and air. Through the use of this burner plate, the mixture of fuel gas and air flowing into the burner housing is uniformly distributed over the surface of the burner plate. After passing through the burner plate, the mixture of fuel gas and air burns in a plurality of flames, which are distributed uniformly over the surface of the burner plate and join to form a flame front. Such flat gas burners are distinguished by the production of a very uniform flame pattern and also by an extremely uniform distribution of fuel gas and air over the surface of the burner plate. As a result it becomes possible to lower the flame temperature further than would otherwise be possible. With such flat burners, operating temperatures of under 900° C. can be established. This makes it possible to minimize the production of nitrogen oxides. Such flat gas burners are used primarily for gas heating of all kinds, through operation with natural gas or "LP gas", such as propane, butane, and the like. However, it is characteristic of the metal burner plates used thus far that they are subject to wear. The role played by the toxic substances contained in the combustion gas, in particular halogen hydrocarbons, and the role played by thermal strains in this process, are uncertain.

It is accordingly an object of the invention to provide a burner plate for a flat burner, which overcomes the hereinafore-mentioned disadvantages of the heretofore-known devices of this general type, which increases the service lives of the burner plates for flat burners and which makes it possible to decrease the lower limit for the flame temperature even further.

With the foregoing and other objects in view there is provided, in accordance with the invention, a flat burner, comprising a burner plate formed of an $Al_2TiO_5$ ceramic having a surface, said burner plate having fuel gas passage or admission openings formed therein being distributed over said surface.

An $Al_2TiO_5$ ceramic provides a material for the burner plate that can be particularly well adapted to the operating conditions prevailing there.

In accordance with another feature of the invention, the $Al_2TiO_5$ ceramic is stabilized by at least one additive selected from the group consisting of $SiO_2$, $ZrO_2$, $MgO$, $Fe_2O_3$, $Na_2O$ and $CaO$. The conversion of the $Al_2TiO_5$ ceramic that can be triggered by higher temperatures can be hindered by one or more of these additives and at the applicable operating temperatures this conversion can even be suppressed completely. The lattice voids triggered by these additives block these changes in the crystalline structure.

In accordance with a further feature of the invention, the $Al_2TiO_5$ ceramic has a coefficient of thermal expansion which can be adjusted even in a range of substantially from $0 \pm 1 \cdot 10^{-6}$ Kelvin. As a result, when there are changes in temperature, either no thermal strains or only minimal thermal strains are produced, and therefore a very high resistance to temperature alternation is attainable. Sudden changes in temperature can accordingly no longer trigger mechanical strains in the structure, and therefore cannot form fine microscopic cracks in the structure that can cause the burner plate to break.

In accordance with an added feature of the invention, the fuel gas passage or admission openings have a cross section in a range substantially between 0.7 and 7 $mm^2$.

In accordance with an additional feature of the invention, the fuel gas passage or admission openings have a cross section in a range substantially between 1.7 and 5 $mm^2$.

In accordance with yet another feature of the invention, the fuel gas passage or admission openings have a cylindrical cross section.

In accordance with yet a further feature of the invention, the passage or admission openings taper conically counter to the flow direction of fuel gas.

In accordance with yet an added feature of the invention, the burner plate has a thickness in a range of substantially from 4 to 10 mm.

With the objects of the invention in view, there is also provided a process for producing a burner plate for a flat burner, which comprises introducing premixed material containing $TiO_2$ and $Al_2O_3$ into a suitable mold, compacting and sintering the material. As a result, the working steps can be minimized, because simultaneous compaction and final shaping become possible due to the prior compression in the mold.

In accordance with another mode of the invention, there is provided a process which comprises premixing the starting material from substantially 50 to 55 percent by weight of $Al_2O_3$, 30 to 35 percent by weight of $TiO_2$, 5 to 10 percent by weight of $SiO_2$, 1 to 5 percent by weight of $ZrO_2$, 0.5 to 5 percent by weight of $MgO$, 0 to 1 percent by weight of $Fe_2O_3$, 0 to 1 percent by weight of $Na_2O$, and 0 to 0.2 percent by weight of $CaO$. The result is not only a thermally stable ceramic but also a capacity for adjustment of the coefficient of thermal expansion.

The coefficient of thermal expansion can be adjusted in the range from $0 \pm 1 \cdot 10^{-6}$ Kelvin, if in accordance with a further mode of the invention, there is provided a process which comprises carrying out the step of sintering the compacted, molded material for substantially from 2 to 3 hours at a temperature of substantially from 1450° to 1550° C. As a result, the proportion of $Al_2TiO_5$ that forms during the sintering attains a value which brings about the desired coefficient of thermal expansion, in combination with the other components of the ceramic.

In accordance with an added mode of the invention, there is provided a process which comprises carrying out the step of compacting the raw material in the mold at a value of substantially from 1.9 to 2.3 $g/cm^3$.

In accordance with a concomitant mode of the invention, there is provided a process which comprises carrying out the step of introducing the premixed material into the mold with a cup mold determining the outer circumference of the burner plate and having taps for the passage or admission openings, and carrying out the compacting step with a pressure plate guided by holes in the taps of the cup mold.

Other features which are considered as characteristic for the invention are set forth in the appended claims.

Although the invention is illustrated and described herein as embodied in a burner plate for a flat burner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figure 1:
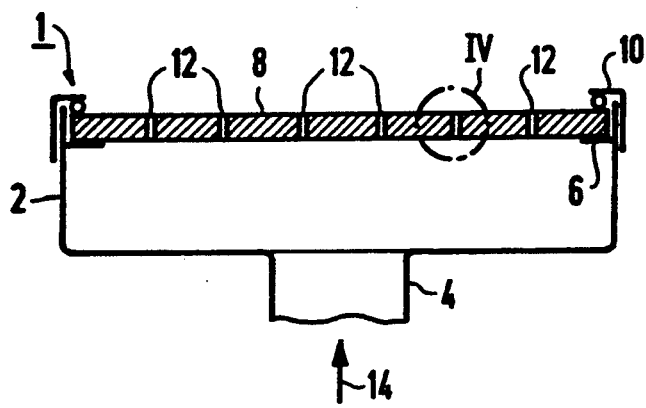
FIG. 1 is fragmentary, diagrammatic, cross-sectional view of a flat burner with an inserted burner plate according to the invention.
Figure 2:
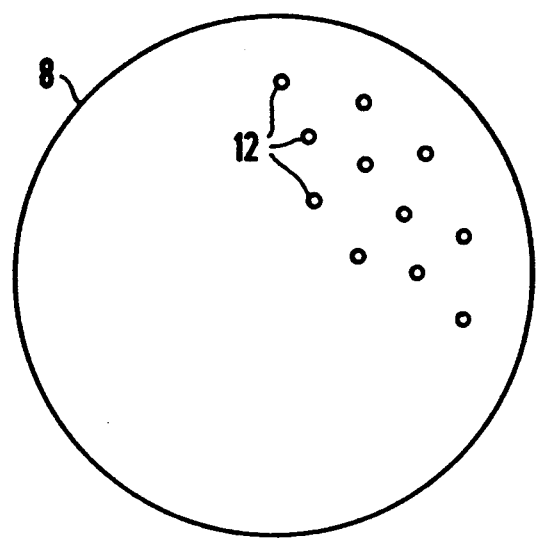
FIG. 2 is a plan view of the burner plate of FIG. 1.
Figure 4:
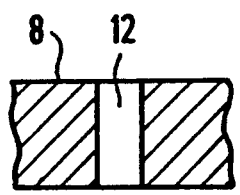
FIG. 4 is an enlarged, fragmentary illustration of a cylindrical passageway hole in the burner plate.

Referring now to the figures of the drawings in detail and first, particularly, to FIG. 1 thereof, there is seen a flat gas burner 1 in section including a burner housing 2 with a formed-on gas connection neck 4, an annular support edge 6 for a burner plate 8, the support edge being welded in place in an inner edge region of the cup-shaped burner housing 2, and a sleeve ring 10 that secures the burner plate against falling out. The sleeve ring 10 is screwed to the housing edge in a non-illustrated manner. As is shown by the plan view of the burner plate 8 in FIG. 2, the burner plate has the outline of a circular disk and is provided uniformly over its entire surface with gas outlet bores 12. In FIG. 4, one such gas outlet bore 12 has been shown on a larger scale in a fragmentary portion of the burner plate. It can be seen from FIG. 4 that the bore 12 has a cylindrical cross section. The diameter of the bore may be in the range from 1 to 4 and preferably from 1.5 to 2.5 mm.

During operation of the flat gas burner 1, fuel gas, preferably a fuel gas and air mixture 14, flows through the gas connection neck 4 into the burner housing 2 underneath the burner plate 8, and flows uniformly out of the burner housing through the various gas outlet bores 12 in the burner plate 8, and after passing through the burner plate 8, the mixture combusts in the heat of the non-illustrated flame front developing there. A uniform, planar flame front develops above the burner plate 8 as a result of the convergence of the mixtures of fuel gas and air flowing out of the various gas outlet bores 12. This flame front has a slight depth at right angles to the plane of the burner plate, and as a result the gas flow through the flame is relatively short both in terms of distance and time. As a result, the flame temperature can be kept relatively low, which in turn results in a reduced formation of nitrogen oxides. Due to the relatively low thermal conductivity of $Al_2TiO_5$ ceramic, the temperature gradient through the wall of the burner plate is relatively high, so that the burner plate remains relatively cool on the side facing away from the flame, and the inflowing fuel gas is by far not heated as severely as would otherwise be the case with metal burner plates. As a result, the fuel gas flows into the flame at a lower temperature, which leads to a further reduction in the flame temperature and leads to a further reduction in $NO_x$ emissions which is associated therewith.

The flame is prevented from flashing back through the gas outlet or passage openings or bores 12 in the burner plate into the burner housing 2 by the fact that the mixture of fuel gas and air in the thin bores in the ceramic plate fails to exceed the temperature of ignition. The fact that the ceramic plate has low conductivity and therefore remains relatively cool on the side facing away from the flame front plays a substantial role in this respect.

Figure 3:
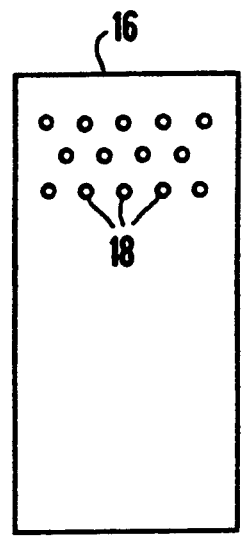
FIG. 3 is a plan view of a different, rectangular burner plate.
Figure 5:
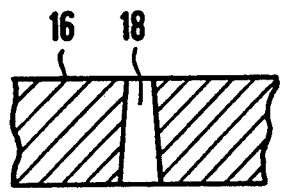
FIG. 5 is a view similar to FIG. 4 of a conical gas passageway hole for the burner plate of FIG. 3.

FIG. 3 shows a burner plate 16 for a rectangular flat burner. FIG. 5 shows a cross section through one of the gas admission or passage openings or feed bores 18 in the burner plate 16. It can be seen in this case that the gas admission openings taper conically toward the flame side. This lowers the average flow resistance through these gas feed bores 18 for a given outlet cross section, so that at a given flow resistance through the burner plate and a given outlet cross section, thicker burner plates can be used. The result is a further reduction in the surface temperature of the burner plate on the side facing away from the flame.

What is claimed:

1. Flat burner, comprising a burner plate formed of an $Al_2TiO_5$ ceramic having a surface, said burner plate having fuel gas passage openings formed therein being distributed over said surface.

2. Flat burner according to claim 1, wherein said $Al_2TiO_5$ ceramic is stabilized by at least one additive selected from the group consisting of $SiO_2$, $ZrO_2$, $MgO$, $Fe_2O_3$, $Na_2O$ and $CaO$.

3. Flat burner according to claim 1, wherein said $Al_2TiO_5$ ceramic has a coefficient of thermal expansion in a range of substantially from $0 \pm 1.10^{-6}$ Kelvin.

4. Flat burner according to claim 2, wherein said $Al_2TiO_5$ ceramic has a coefficient of thermal expansion in a range of substantially from $0 \pm 1.10^{-6}$ Kelvin.

5. Flat burner according to claim 1, wherein said fuel gas passage openings have a cross section in a range substantially between 0.7 and 7 mm$^2$.

6. Flat burner according to claim 1, wherein said fuel gas passage openings have a cross section in a range substantially between 1.7 and 5 mm$^2$.

7. Flat burner according to claim 1, wherein said fuel gas passage openings have a cylindrical cross section.

8. Flat burner according to claim 1, wherein said passage openings taper conically in the flow direction of fuel gas.

9. Flat burner according to claim 1, wherein said burner plate has a thickness in a range of substantially from 4 to 10 mm.

10. Process for producing a burner plate for a flat burner, which comprises introducing premixed material containing $TiO_2$ and $Al_2O_3$ in proportion to produce $Al_2TiO_5$ into a mold, compacting and sintering the material, and distributing fuel gas passage openings over the surface of the material.

11. Process according to claim 10, which comprises premixing the material from substantially 50 to 55 percent by weight of $Al_2O_3$, 30 to 35 percent by weight of $TiO_2$, 5 to 10 percent by weight of $SiO_2$, 1 to 5 percent by weight of $ZrO_2$, 0.5 to 5 percent by weight of $MgO$, 0 to 1 percent by weight of $Fe_2O_3$, 0 to 1 percent by weight of $Na_2O$, and 0 to 0.2 percent by weight of $CaO$.

12. Process according to claim 10, which comprises carrying out the step of sintering the compacted, molded material for substantially from 2 to 3 hours at a temperature of substantially from 1450° to 1550° C.

13. Process according to claim 10, which comprises carrying out the step of compacting the material in the mold at a value of substantially from 1.9 to 2.3 g/cm$^3$.

14. Process according to claim 12, which comprises carrying out the step of compacting the material in the mold at a value of substantially from 1.9 to 2.3 g/cm$^3$.

15. Process according to claim 10, which comprises carrying out the step of introducing the premixed material into the mold with a cup mold determining the outer circumference of the burner plate and having taps for the passage openings, and carrying out the compacting step with a pressure plate guided by holes in the taps of the cup mold.

* * * * *

UNITED STATES PATENT AND TRADEMARK OFFICE
CERTIFICATE OF CORRECTION

PATENT NO. : 5,057,006
DATED : October 15, 1991
INVENTOR(S) : ULRIKE FOLLERT and JOCHEN JACOBITZ It is certified that error appears in the above—identified patent and that said Letters Patent is hereby corrected as shown below:

Column 1, line 67, and
Column 2, line 43,

"$0\pm1. \ 10^{-6}$ Kelvin"

should read

-- $0\pm1 \cdot 10^{-6}$ Kelvin --.

Column 4, line 31 (Claim 3, line 3), and
Column 4, line 34 (Claim 4, line 3),

"$0\pm1.10^{-6}$ Kelvin"

should read

-- $0\pm1 \cdot 10^{-6}$ Kelvin --.

Signed and Sealed this

Sixteenth Day of March, 1993

Attest:

STEPHEN G. KUNIN

Attesting Officer        Acting Commissioner of Patents and Trademarks